United States Patent
Meierling et al.

(12) 
(10) Patent No.: US 6,335,945 B1
(45) Date of Patent: Jan. 1, 2002

(54) ELECTRIC ARC LOW-SHAFT SMELTING FURNACE WITH A CENTRAL TUBE WITH TELESCOPIC ELECTRODES AND A SLIDING UPPER RECEPTACLE LID

(75) Inventors: Peter Meierling, Düsseldorf; Andreas Schüring, Mülheim; Hans-Ludwig Schaller, Moers, all of (DE)

(73) Assignee: SMS Demag AG, Düsseldorf (DE)

( * ) Notice: Subject to any disclaimer, the term of this patent is extended or adjusted under 35 U.S.C. 154(b) by 0 days.

(21) Appl. No.: 09/554,916

(22) PCT Filed: Nov. 6, 1998

(86) PCT No.: PCT/DE98/03295

§ 371 Date: May 22, 2000

§ 102(e) Date: May 22, 2000

(87) PCT Pub. No.: WO99/27141

PCT Pub. Date: Jun. 3, 1999

(30) Foreign Application Priority Data

Nov. 21, 1997 (DE) .......................................... 197 53 184

(51) Int. Cl.[7] ............................................. F27D 3/00
(52) U.S. Cl. .............................. 373/82; 373/79; 373/81; 373/83
(58) Field of Search ........................ 373/71–72, 79–85, 373/42–43, 2; 75/10.2, 10.42; 266/89, 175, 205, 217, 218, 225, 901; 432/162

(56) References Cited

U.S. PATENT DOCUMENTS

| | | | | |
|---|---|---|---|---|
| 3,316,082 A | * | 4/1967 | Barloga et al. | 373/80 |
| 3,556,771 A | * | 1/1971 | Bruning et al. | 373/80 |
| 4,308,415 A | * | 12/1981 | Hasegawa et al. | 373/79 |
| 4,852,858 A | * | 8/1989 | Weber | 266/175 |
| 5,454,852 A | * | 10/1995 | Pirklbauer et al. | 75/10.42 |
| 5,555,259 A | * | 9/1996 | Feuerstacke | 373/80 |
| 5,879,617 A | * | 3/1999 | Fuchs et al. | 266/89 |

* cited by examiner

Primary Examiner—Tu Ba Hoang
(74) Attorney, Agent, or Firm—Cohen, Pontani, Lieberman & Pavane

(57) ABSTRACT

A smelting furnace system for smelting metals, especially steel scrap, with a lower furnace vessel, in the bottom of which a tap hole is provided, and with an upper furnace vessel, which can be closed by a cover, in which a central pipe is provided coaxially with respect to the main axis of the furnace, in which pipe at least one electrode is arranged, and on which pipe there is provided a component which encompasses the upper furnace vessel and can be connected to a gas offtake device. In this arrangement, a slit is provided in the wall of the central pipe in a longitudinal direction. A sleeve is fastened at the edge of the slit, allowing the central pipe to be fastened to the casing of the upper furnace vessel having a corresponding slit. Furthermore, a supporting arm, which is connected to a supporting pillar arranged outside the furnace, can be led through the hollow space of the sleeve into the central pipe, with at least one electrode fastened on the front face of this arm.

23 Claims, 6 Drawing Sheets

Fig. 2
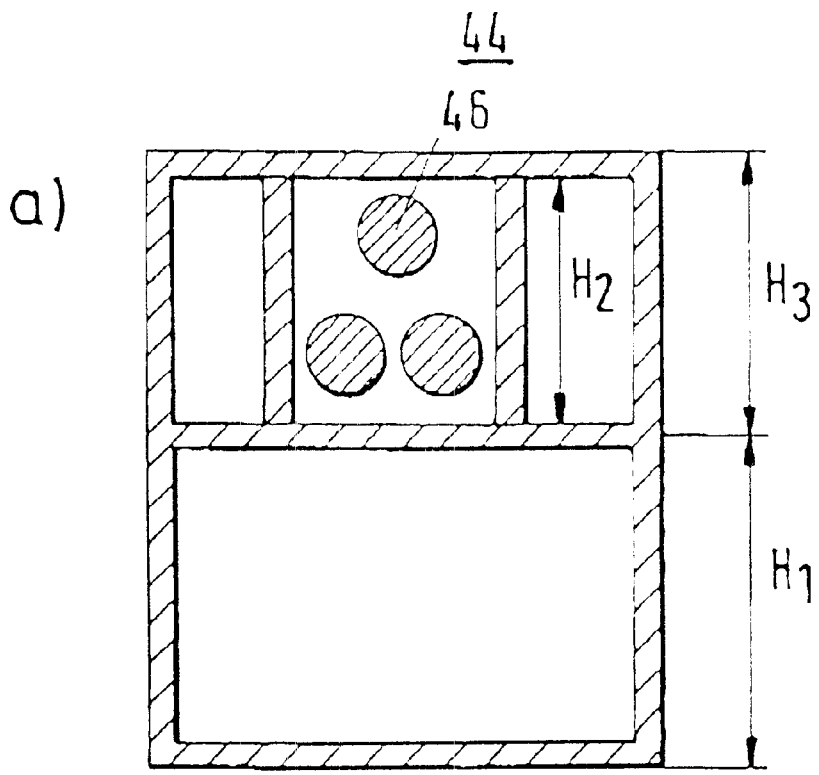
a)
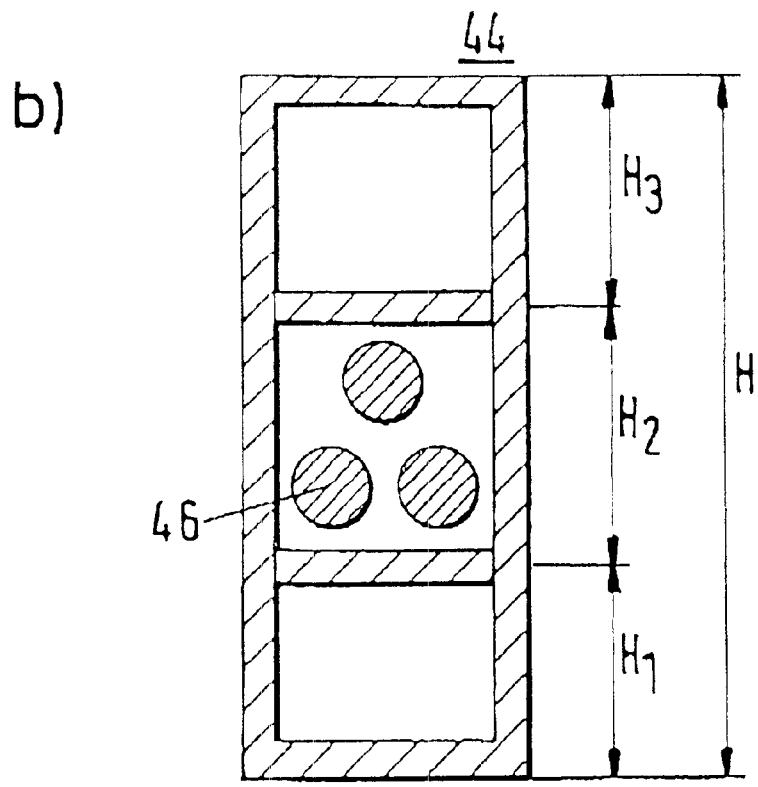
b)

ELECTRIC ARC LOW-SHAFT SMELTING FURNACE WITH A CENTRAL TUBE WITH TELESCOPIC ELECTRODES AND A SLIDING UPPER RECEPTACLE LID

BACKGROUND OF THE INVENTION

1. Field of the Invention

The invention relates to a smelting furnace system and a method for smelting metals, especially steel scrap, with a lower furnace vessel, in the bottom of which a tap hole is provided, and with an upper furnace vessel, which can be closed by a cover and in which a central pipe is provided coaxially with respect to the main axis of the furnace. A least one electrode is arranged, in the pipe and on the pipe there is provided a component which encompasses the upper furnace vessel and can be connected to a gas offtake device. The invention further relates to means for feeding the charge, a method for operating a smelting furnace system mentioned above and also a device for top blowing oxygen.

2. Discussion of the Prior Art

German reference DE-A-19 37 839 discloses a method and an arc furnace for the continuous smelting of iron scrap, in which the charging space in its upper part is separated from the combustion space of the furnace by a protective wall. In the lower part, the progressively slipping down slope of starting product is exposed to the radiation of the arc and the smelting product is discharged by known means arranged in the combustion space.

In the case of the furnace required for this purpose, the charge is passed only partly around the electrodes. In addition, the electrodes protrude from above through a cover into the smelting vessel.

German reference DE-B-23 42 959 discloses a shaft furnace in which the electrodes attached to a guide at the lower end are led through the charging pillar and the electrodes are kept at such a distance from the bottom of the shaft furnace that an approximately spherical melting space is formed.

The disadvantage of this device is that it is not possible for the length of the arc to be changed by moving the electrodes vertically, since the guide is held almost fixedly in the pillar of scrap.

Furthermore, German reference DE 42 36 510 C2 discloses a device for smelting scrap in which an arc furnace has a cathode protruding into a vessel of a shaft furnace operated on direct current. A cathode is provided at the bottom of the vessel. The anode is surrounded concentrically by a pipe and is movable in relation to said pipe.

In the case of this form of furnace, feeding of a charge from above over a large surface area onto the overall stock level is scarcely possible. Furthermore, in contrast to operating with three-phase current, in the case of the known shaft furnace the counter electrode has to be arranged in the bottom of the lower vessel, which leads to particular difficulties with respect to the service life of the lower furnace vessel.

SUMMARY OF THE INVENTION

The object of the invention is to provide by means of a simple design a smelting system with which a continuous smelting of metals, especially of scrap and of ores, is possible cost-effectively and which has as little environmental impact as possible.

The invention proposes a vessel which has a central pipe and a relatively high shaft. This arrangement makes it possible in a very reliable way to pass charges through the furnace in an annular form and at the same time preheat them by rising waste gases.

This vessel can be used as a smelting furnace which is run with electrodes operated on three-phase current. These electrodes are held by a supporting arm, which is led sideways through a sleeve and to which the central pipe is also fastened.

The electrodes are accommodated in a protected manner in the space inside the central pipe and protrude into the mouth region, the radiant heat melting the charge dropping down in an annular manner.

To boost the smelting capacity, burners may be used, operated by fossil combustion gases, for example natural gas. Furthermore, oxygen can also be blown in through these lances in the lower region.

Furthermore, the invention proposes introducing an oxygen lance into the central pipe. This oxygen lance has a supporting device of its own and can be moved independently of the electrode supporting arm. In an advantageous embodiment, this oxygen lance is moved from above centrally between the electrodes into the metallurgical vessel. In a further embodiment, the lance is bent by a bending device provided outside the furnace and is passed through the sleeve in a semicircular arc and positioned in such a way that its tip is exactly on the main axis of the furnace. The lance can be moved completely out of its position by simple means. When oxygen is used, the metallurgical vessel can be operated like a converter. Here it is thus possible to charge pig iron and at the same time low-carbon iron charge materials as well as the usual additions of lime and similar additives.

By simply switching off the oxygen supply and switching on the electrical energy, the metallurgical vessel can be changed over directly from converter operation to the operation of an electric arc furnace.

In an advantageous development, the central pipe is relatively far away from the bottom of the vessel in this operating mode.

During the later phase of introducing thermal energy via an electric arc, the central pipe is brought back close to the bottom and then serves both for guiding the charge and protecting the electrodes.

BRIEF DESCRIPTION OF THE DRAWINGS

An example of the invention is presented in the attached drawing, in which:

FIG. 2 shows a section through the electrode supporting arm;

DETAILED DESCRIPTION OF THE PREFERRED EMBODIMENT

Figure 1:
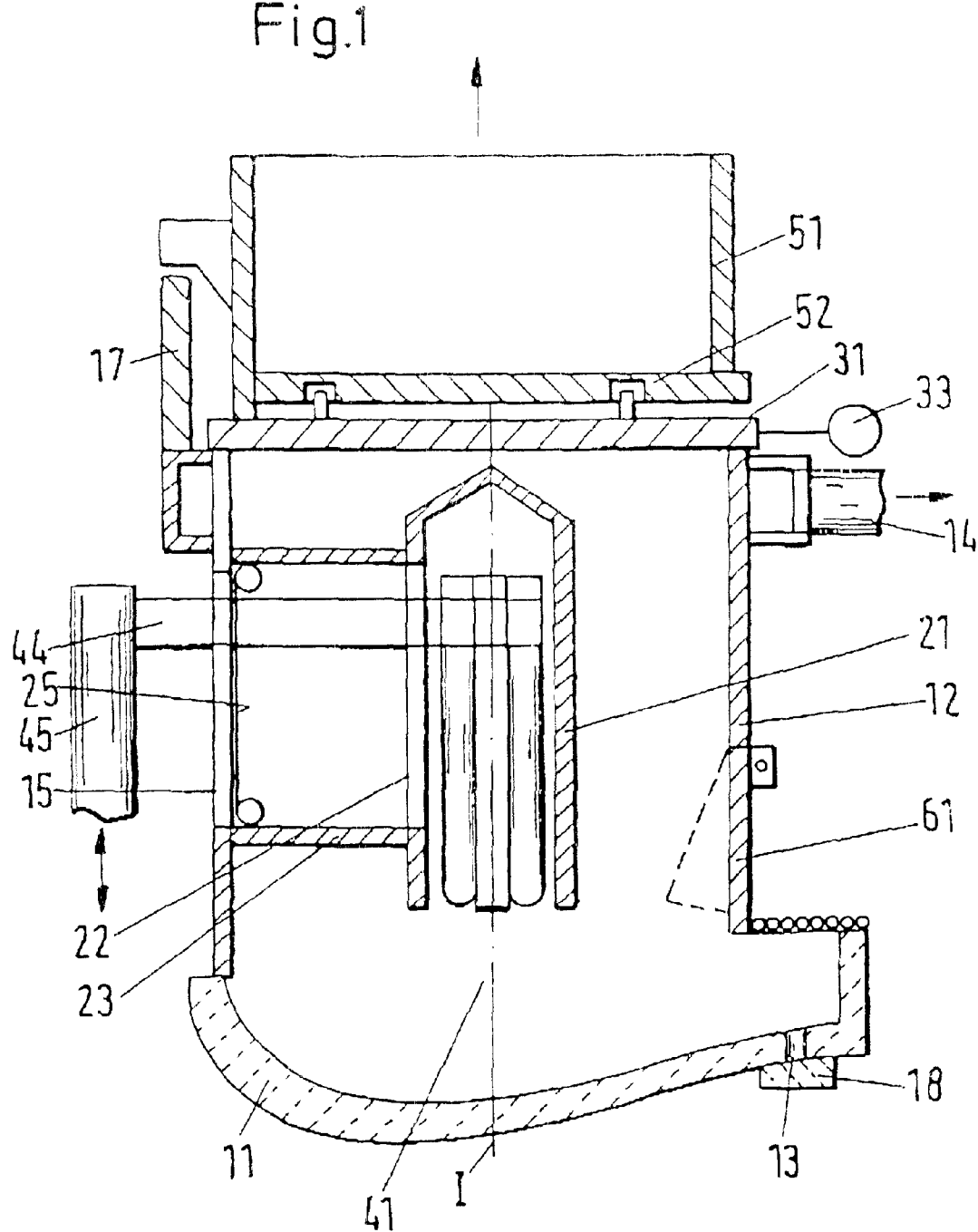
FIG. 1 shows the diagram of a smelting furnace system.

FIG. 1 shows a smelting furnace, with a lower furnace vessel 11, which has a bottom tap 13 which can be closed by a shut-off 18, and an upper furnace vessel 12, which is closed by a cover 31. Provided at the top of the upper furnace vessel 12 is a gas offtake device 14 and fitted in the lower region of the upper furnace vessel are hinged flops 61.

Arranged coaxially with respect to the cylindrical upper furnace vessel 12 is a central pipe 21, which is fastened to the upper furnace vessel 12 via a sleeve 23. Provided in the region of the sleeve 23 are the central pipe 21, a slit 22 and, on the upper furnace vessel 12, a vessel slit 15.

The inner free space formed by the sleeve 23 can be closed in a gastight manner by a louver-type shutter 25.

Led through the sleeve 23 is an electrode supporting arm 44, which at one end is supported on a supporting pillar 45 and at the other end bears electrodes 41 to 43.

Provided above the upper furnace vessel 12 is a container 51, which is supported on the upper furnace vessel 12 via supporting arms 17.

FIG. 2 shows the power leads 46 in the electrode supporting arm 44. Both in the upper illustration and in the lower illustration, the height H that is relevant in terms of bending is made up of the individual heights of the side parts, to be precise H1+H2+H3.

Figure 3:
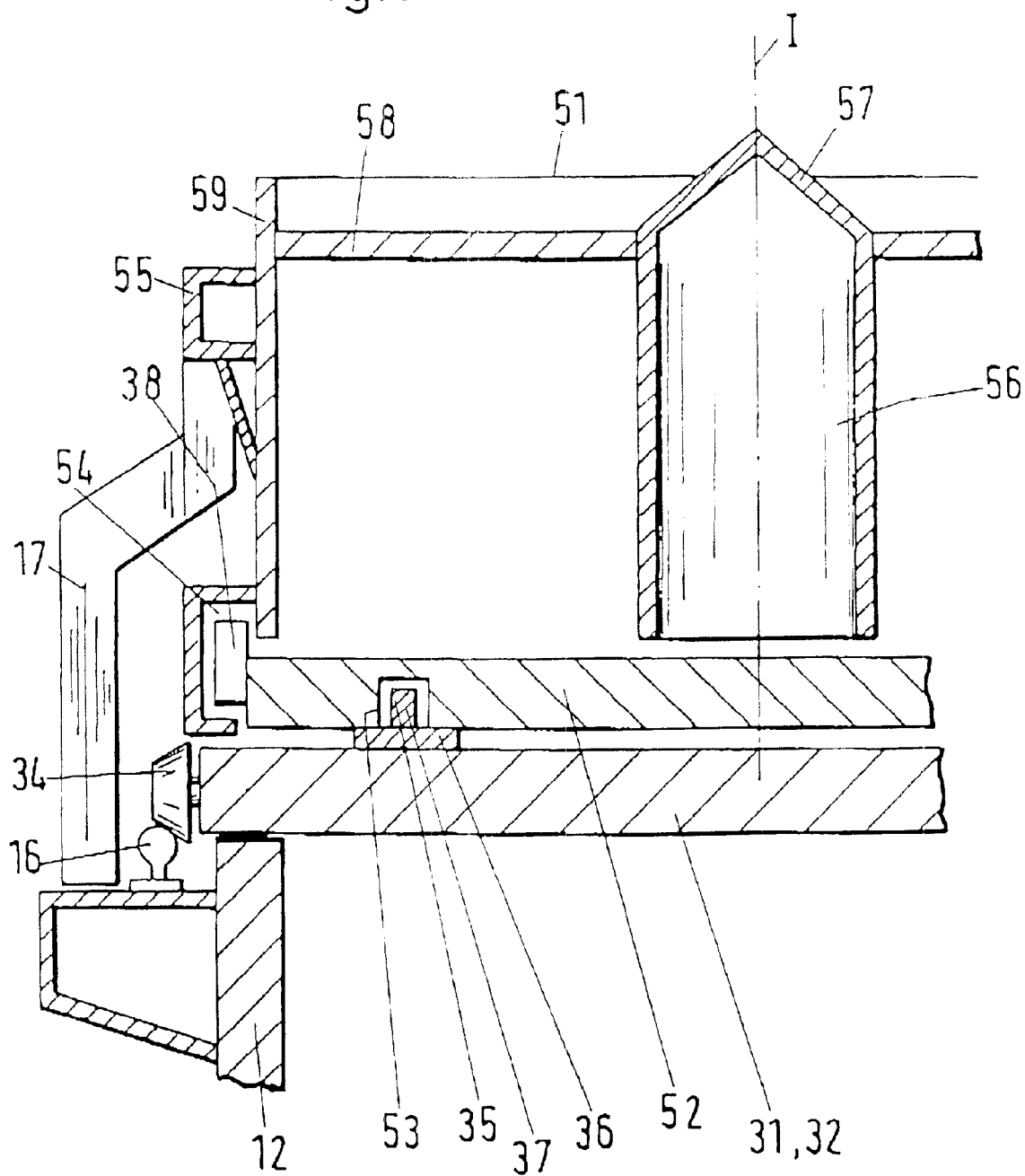
FIG. 3 shows the feeding of material.

FIG. 3 shows the container 51, which is designed as a charging cage, as it is set down on the upper part of the upper furnace vessel 12. The container 51 has a centrally arranged protective pipe 56, which is held by means of suspensions 58. The protective pipe 56 is covered on one side by a cap 57.

The bottom 52 of the container 51 has a guiding edge 38, which can be guided in a guiding part 54 of the container 51 into a closing position and an opening position.

Provided in the bottom 52 are lower parts 53, into which male parts 37 protrude and are connected via a supporting plate 36 to the cover 31 designed as a slide plate 32.

When the container 51 is set in place, brackets 55 mounted to the container casing; are supported on the supporting arms 17, which are connected to the upper furnace vessel 12. During this supporting, the guiding edge 38 of the bottom 52 of the container 51 is relieved in the guiding part 54, the bottom 52 coming to lie freely on the supporting plate 36 and consequently on the slide plate 32.

In the present case, the slide plate 32 has wheels 34 which run over rails 16 which are fastened on the upper furnace vessel 12. For charging, the cover 31, which closes the upper furnace vessel 12, including the bottom 52, can thus be moved by a drive 33 and driving elements 35 with relatively little force and the charge falls out of the container 51.

Figure 4:
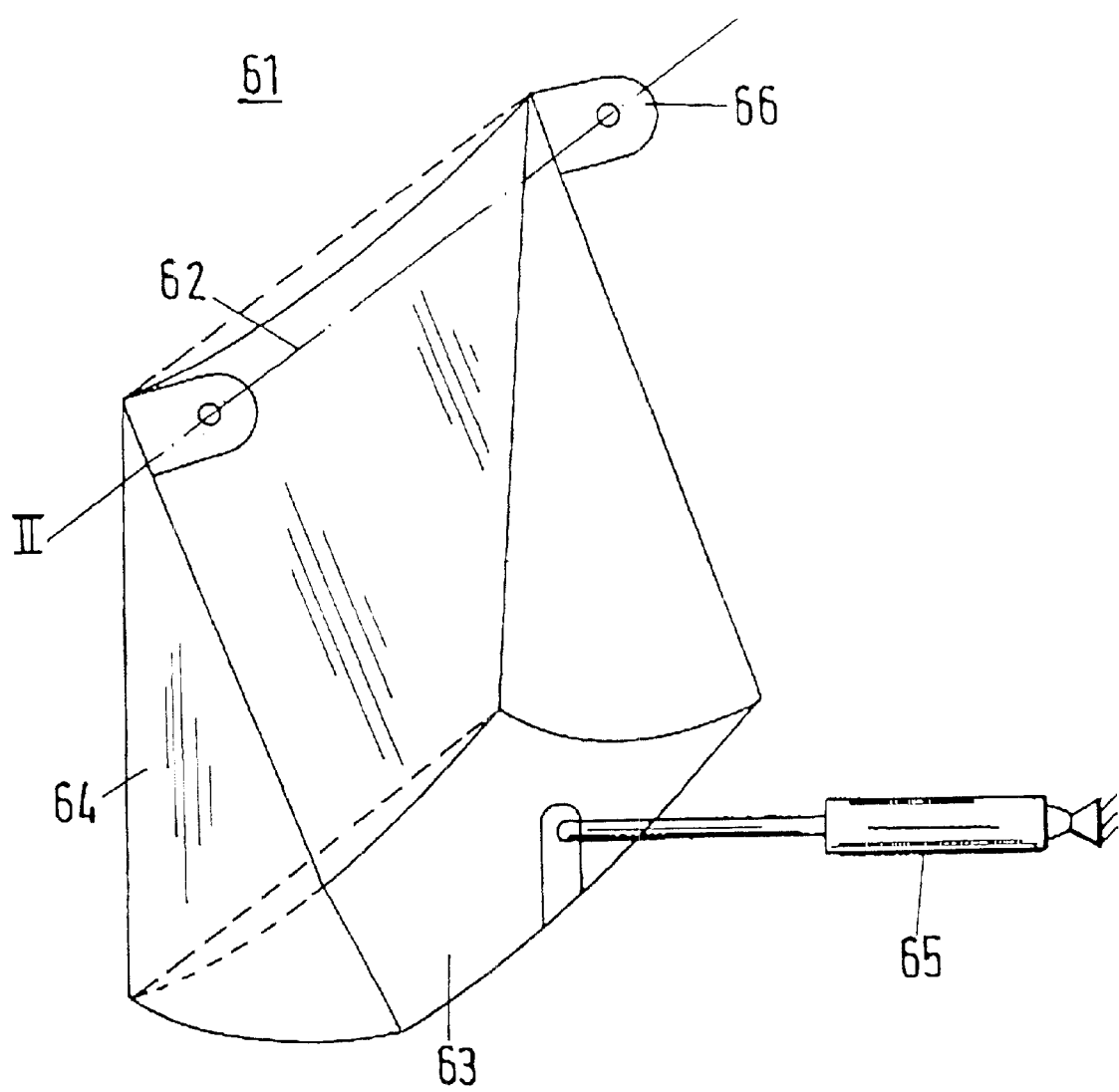
FIG. 4 shows the material holding device.

FIG. 4 shows the hinged flaps 61, which are provided in the lower part of the upper furnace vessel 12, and with which the charge can be reduced in its falling speed or even hindered.

The hinged flaps 61 have a front plate 62 and a bottom wall 63 as well as two side walls 64. This form, similar to a pocket, allows the hinged flaps 61 to pivot in about the pivot axis II at the butt straps 66 by means of the pivot drive 65.

In addition to these hinged flaps 61, prongs and similar shut-off elements may also be used.

Figure 5:
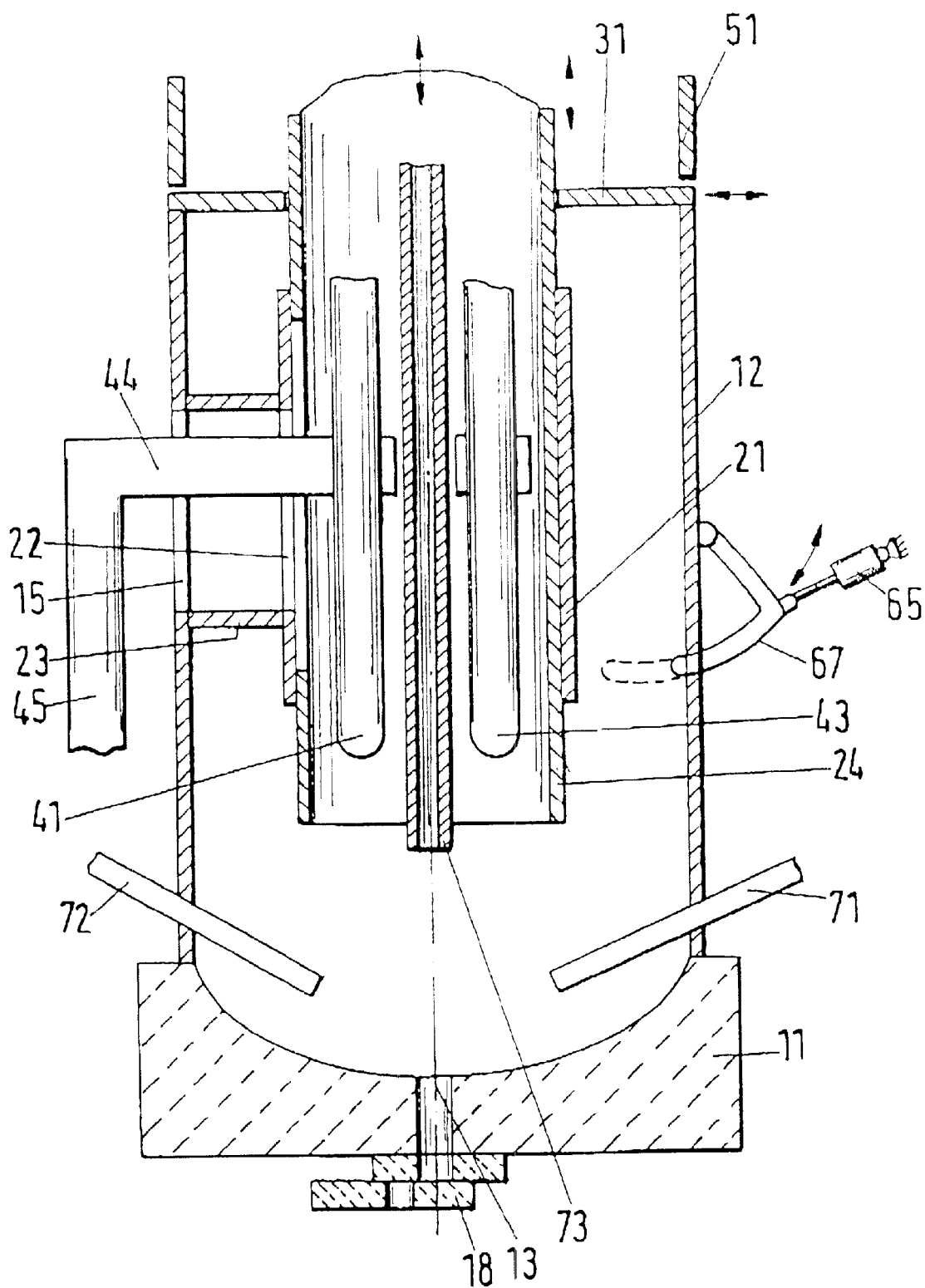
FIG. 5 shows a metallurgical vessel as a converter.

FIG. 5 represents a metallurgical vessel, with a lower furnace vessel 11, the bottom tap of which can be closed by a shut-off 18. Provided in the lower part of the upper furnace vessel 12 are burners 71 and lances 72, which protrude into the interior of the furnace.

Also provided on the upper furnace vessel 12 are shut-off elements, here prongs 67, which can be moved into the interior of the furnace or out of the latter by means of a pivot drive 65.

A container 51 is indicated at the top of the furnace.

Provided concentrically with respect to the central pipe 21 is a skirt 24, the mouth of which can be set in its distance from the bottom of the vessel of the lower furnace vessel 11.

Also provided is a lance 73, with which oxygen can be top blown. In the present case, the lance is arranged centrally with respect to the center axis I of the furnace and can be moved laterally by holders (not represented in any more detail).

The lance 73 is arranged between electrodes 41 and 43, which are connected to the supporting pillar 45 via the electrode supporting arm 44. In addition to the electrodes and the introduction of electrical energy, the metallurgical vessel represented in FIG. 5 creates a possible way of blowing oxygen into the vessel, as previously known in the case of converters.

Without the furnace vessel having to be opened, it is possible to change over from the refining phase into the smelting phase. For this, it is only the electrodes that are brought into the operating position instead of the oxygen lance.

Adapted to the respective requirements of the current operating phase in the operating states of refining or smelting, the mouth of the central pipe, or here the skirt, is set in its depth of penetration into the upper furnace vessel 12.

Figure 6:
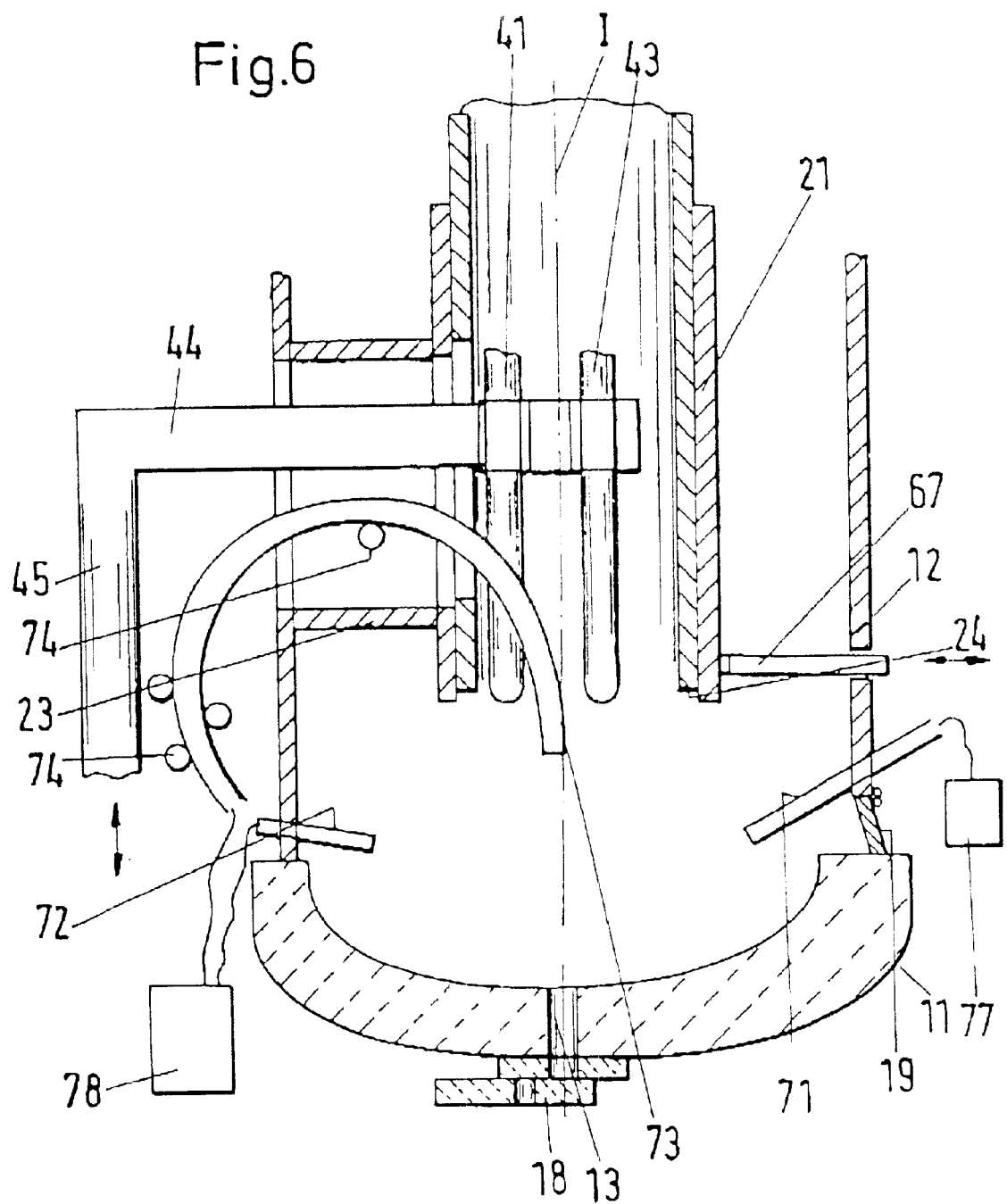
FIG. 6 shows a metallurgical vessel with a top-blowing lance.

In FIG. 6, as a change from FIG. 5, the top-blowing lance 73 is led through the sleeve 23. In the present case, for this purpose it is bent by a holder 74, which may be designed as a bending station, in such a form that the tip of the top-blowing lance 73 is positioned exactly in the position in the center axis I of the furnace.

After top blowing oxygen, this lance can be removed from its operating area in a particularly simple way.

A slag door 19 is connected to the bottom of the upper vessel 12 to permit slag removal. An oxygen supply station 78 supplies oxygen to the lances 72, 73 and a fossil combustible gas supply station 77 supplies gas to the burner 71.

What is claimed is:

1. A smelting furnace system for smelting metals, comprising:
a lower furnace vessel having a bottom with a tap hole; an upper furnace vessel having a casing; a cover arranged to close the upper furnace vessel; a central pipe arranged in the upper furnace vessel coaxially with respect to a main axis of the furnace vessels and having a wall with a longitudinally extending slit; at least one electrode arranged in the pipe; a component arranged on the pipe so as to encompass the upper furnace vessel and be connectable to a gas offtake device; a sleeve having one end fastened at an edge of the slit and another end connected to the casing of the upper furnace vessel, the casing having a slit corresponding to the slit in the central pipe; a support pillar arranged outside the furnace vessels; a supporting arm connected to the supporting pillar so as to be led through a hollow space of the sleeve into the central pipe; and at least one electrode fastened on a front face of the supporting arm.

2. A smelting furnace system as defined in claim 1, wherein three electrodes operated on alternating current are clamped onto the supporting arm, the electrodes having power leads that are led through the supporting arm.

3. A smelting furnace system as defined in claim 2, wherein the supporting arm is constructed from a profile having a height (H) that is relevant in terms of bending and relates to its width (B) as H/B=1.5 to 2.5/1.

4. A smelting furnace system as defined in claim 1, wherein the cover is as a slide plate, and further comprising drive means for displacing the slide plate transversely with respect to the main axis of the furnace vessels.

5. A smelting furnace system as defined in claim 4, and further comprising rails provided on the upper furnace vessel, and wheels provided on the cover so as to run on the rails.

6. A smelting furnace system as defined in claim 1, and further comprising a material feeding container which can be set down on the upper furnace vessel, and driving elements provided on an upper side of the cover so as to allow a positive connection to be established with a bottom of the material feeding container.

7. A smelting furnace system as defined in claim 6, wherein the driving elements comprise a supporting plate and a male part, the supporting plate being configured to protrude away from the cover so that, when the bottom of the container is set down on the cover, an edge of the cover designed as a guide is received in a guide channel located in the container.

8. A smelting furnace system as defined in claim 7, comprising further supporting arms fastened to the upper furnace vessel and having a length which allows stress relief of the guide of the guiding channel and the cover edge, and brackets attached to the container and supported in a centering manner on the further supporting arms.

9. A smelting furnace system as defined in claim 1, and further comprising shut-off elements provided so as to be introducable into a space inside the upper furnace vessel so as to interrupt a delivery flow of charge material.

10. A smelting furnace system as defined in claim 9, wherein the shut-off elements are hinged flaps which can be pivoted by means of pivot drives about a pivot axis into the space inside the upper furnace vessel.

11. A smelting furnace system as defined in claim 10, wherein the hinged flaps have a front plate with a bottom wall and side walls configured to ensure sealing tightness of the upper furnace vessel after pivoting in of the hinged flaps.

12. A smelting furnace system as defined in claim 9, wherein the shut-off elements are prongs which can be drawn into and out of the space inside the upper furnace vessel.

13. A smelting furnace system as defined in claim 6, wherein the container has a centrally arranged protective pipe which is closed off by a cap and is fastened to the container casing via suspensions.

14. A smelting furnace system as defined in claim 1, and further comprising a skirt arranged coaxially with respect to the central pipe so as to be displaceable with respect to the central pipe so that a mouth of the central pipe surrounding the electrode as a protective pipe can be changed in its position.

15. A smelting furnace system as defined in claim 1, and further comprising lances connected to supply stations of at least one of fossil combustible gases and oxygen-containing gases, the lances being introduced in a lower region of the upper furnace vessel.

16. A method for operating a smelting furnace system with a lower furnace vessel, in a bottom of which a tap opening is provided, and an upper furnace vessel, which can be closed by a cover and in which a central pipe arranged coaxially with respect to a main axis of the furnace vessels is provided, at least one electrode being provided in the pipe, as well as a gas offtake device which encompasses the upper furnace vessel, and means for feeding a charge, the method comprising the steps of:

closing the upper furnace vessel with the cover and temporarily storing a charge above the upper furnace vessel;

opening the furnace cover so that the charge falls into a space inside the furnace vessels
  a) before a beginning of furnace operation, so that the charge falls into the lower furnace vessel, and
  b) during furnace operation, onto the charge previously introduced and located in an annular form in the upper furnace vessel;

burning a cavern into the charge by generating longest possible arcs from electrodes protected by the central pipe and operated on an alternating current; and tapping smelted material via a tap opening.

17. A method as defined in claim 16, including changing a flow of the charge material present in an annular form in the upper furnace vessel in a predeterminable manner by at least one of holding elements and clamping elements.

18. A method as defined in claim 16, including regulating arc length of the electrodes operated on alternating current by means of a lowest amount of current of one of the electrodes.

19. The method as defined in claim 16, further including burning hollow spaces into the charge by burning fossil fuels into the charge, in addition to the introduction of electrical energy via electrodes.

20. A metallurgical vessel, comprising: a lower vessel lined with refractory material, in a bottom of which a tap hole is provided; an upper vessel having a casing; a cover arranged to close the upper vessel; a central pipe arranged in the upper vessel coaxially with respect to a main axis of the vessels and having a wall with a longitudinally extending slit; at least one electrode arranged in the pipe; a component which encompasses the upper vessel and is connectable to a gas offtake device; a sleeve having one end fastened at an edge of the slit and another end connected to the casing of the upper vessel, the casing having a slit corresponding to the slit in the central pipe; a top-blowing lance fastened displaceably on a holder axially parallel to the electrodes; a system for delivery of oxygen-containing gases connected to the blowing lance; and a skirt arranged coaxially with respect to the main axis of the furnace vessels and axially parallel to the electrodes so that a mouth of the skirt points toward the bottom of the lower vessel, the skirt being provided at least at a top end on the central pipe, and being axially displaceable.

21. The metallurgical vessel as defined in claim 20, wherein the holder is led through the central pipe to above the upper vessel.

22. The metallurgical vessel as defined in claim 20, wherein the holder is a bending and delivering device which is arranged outside the upper vessel and bends the blowing lance so that the lance is led in an arc through the sleeve, with its mouth assuming a desired position on the main axis of the vessels.

23. A method for operating a metallurgical vessel, with a lower vessel which is provided with refractory lining and an upper vessel which can be closed by a cover, is connected to a gas takeoff device and in which a central pipe in which at least one of electrodes and a lance can be introduced is provided axially parallel, comprising the steps of:
- introducing a charge of low-carbon iron charge materials into the vessels;
- carrying out refining by means of an oxygen top-blowing lance;
- simultaneously charging pig iron and additions;
- subsequently removing slag;
- apportioned charging with scrap while simultaneously heating the charge with furnace gases;
- introducing thermal energy via an electrical arc furnace;
- selectively introducing thermal energy by means of fossil fuels;
- removing residual slag; and,
- subsequently tapping off liquid smelt, exerting a load on a liquid pool.

* * * * *